United States Patent
Fellows et al.

(10) Patent No.: US 11,379,880 B1
(45) Date of Patent: Jul. 5, 2022

(54) SYSTEMS AND METHODS FOR ADMINISTERING AN ONLINE ADVERTISER BIDDING INTERFACE

(75) Inventors: James Fellows, Baltimore, MD (US); Brent Halliburton, Columbia, MD (US); Eric Bosco, Washington, DC (US)

(73) Assignee: Yahoo Ad Tech LLC, Dulles, VA (US)

( * ) Notice: Subject to any disclaimer, the term of this patent is extended or adjusted under 35 U.S.C. 154(b) by 2905 days.

(21) Appl. No.: 12/565,187

(22) Filed: Sep. 23, 2009

Related U.S. Application Data

(60) Provisional application No. 61/099,483, filed on Sep. 23, 2008.

(51) Int. Cl.
*G06Q 30/00* (2012.01)
*G06Q 30/02* (2012.01)
*G05B 19/418* (2006.01)

(52) U.S. Cl.
CPC .............................. *G06Q 30/0275* (2013.01)

(58) Field of Classification Search
CPC .................................................. G06Q 30/0275
USPC ........................................................... 705/14
See application file for complete search history.

(56) References Cited

U.S. PATENT DOCUMENTS

| | | | | |
|---|---|---|---|---|
| 9,053,492 B1* | 6/2015 | Stanley | .............. | G06Q 30/0224 |
| 2002/0073119 A1* | 6/2002 | Richard | ............ | G06F 17/30569 |
| | | | | 715/239 |
| 2006/0212350 A1* | 9/2006 | Ellis | .................. | G06Q 30/0275 |
| | | | | 705/14.66 |
| 2007/0005421 A1* | 1/2007 | Labio | ................. | G06Q 30/0247 |
| | | | | 705/14.54 |
| 2007/0143186 A1* | 6/2007 | Apple et al. | .................... | 705/14 |
| 2007/0162342 A1* | 7/2007 | Klopf | ..................... | G06Q 30/02 |
| | | | | 705/14.61 |
| 2007/0265923 A1* | 11/2007 | Krassner | ................ | G06Q 30/02 |
| | | | | 705/14.51 |
| 2007/0271145 A1* | 11/2007 | Vest | ............................... | 705/14 |
| 2008/0010120 A1* | 1/2008 | Chung et al. | .................... | 705/14 |
| 2008/0275753 A1* | 11/2008 | Protheroe | .......... | G06Q 30/0273 |
| | | | | 705/14.69 |
| 2008/0294524 A1* | 11/2008 | Badros | ............... | G06Q 30/0275 |
| | | | | 705/14.54 |

OTHER PUBLICATIONS

"Online Advertisement Campaign Optimization". IEEE. 2007 (Year: 2007).*

* cited by examiner

*Primary Examiner* — Maria V Vanderhorst
(74) *Attorney, Agent, or Firm* — Bookoff McAndrews, PLLC

(57) ABSTRACT

A computer-implemented method is provided for administering an online advertiser bidding interface. The method includes providing a bidding interface to an advertiser through a web server, by which an advertiser may bid on online advertising inventory of an online publisher, the bidding interface displaying a plurality of targeting elements; receiving targeting information from the advertiser through the targeting elements of the bidding interface and the web server; and generating an advertising bid based on the received targeting information. A system is also provided for administering an online advertiser bidding interface.

10 Claims, 18 Drawing Sheets

SET UP CAMPAIGN | TARGET + BID | SET BUDGET | ADD BANNERS | CREATE ACCOUNT | REVIEW + LAUNCH

TARGET AND BID

| | AVAILABLE DAILY IMPRESSIONS: | MINIMUM BID: $1.00 |
|---|---|---|
| | 1,585,748,569 | SUGGESTED BID: $1.10 - 1.20 |

TARGET BY GEOGRAPHY
CHOOSE THE GEOGRAPHICAL AREA WHERE YOUR AD SHOULD BE DISPLAYED.
- ⦿ DISPLAY ADS TO THE ENTIRE COUNTRY
- ○ DISPLAY ADS ONLY TO SPECIFIC STATES/PROVINCES
- ○ DISPLAY ADS ONLY TO SPECIFIC CITIES/DMAS

DID YOU KNOW?
MORE SPECIFIC TARGETING MAY IMPROVE THE EFFICIENCY OF YOUR MARKETING ACTIVITY, BUT LIMITS YOUR AVAILABLE AUDIENCE AND INCREASES THE MINIMUM REQUIRED BID.

TARGET BY TYPE OF SITE
CHOOSE THE TYPES OF SITES WHERE YOU WANT YOUR ADS TO BE SHOWN.
- ⦿ ALL TYPES OF SITES
- ○ SPECIFIC TYPES OF SITES ACROSS THE WEB
- ○ SPECIFIC SECTIONS OF AOL.COM AND OTHER AOL PROPERTIES

REPRESENTATIVE SITES
NETWORK MEMBERS CAN VIEW A LIST OF REPRESENTATIVE SITES WHERE A CAMPAIGN WOULD BE DISPLAYED. CREATE AN ACCOUNT OR LOGIN TO VIEW THE SITE LIST.

TARGET BY AUDIENCE
WHAT TYPES OF WEB VISITORS DO YOU WANT TO TARGET?
- ⦿ ALL TYPES OF VISITORS
- ○ VISITORS WITH A SPECIFIC DEMOGRAPHIC ATTRIBUTE
- ○ VISITORS WITH A SPECIFIC INTEREST

SET YOUR MAXIMUM BID
MINIMUM BID: $1.00    SUGGESTED BID: $1.10 - $1.20

ENTER YOUR MAXIMUM BID*   $ [1.00]  PER THOUSAND IMPRESSIONS

[NEXT]

SET UP CAMPAIGN | TARGET + BID | SET BUDGET | ADD BANNERS | CREATE ACCOUNT | REVIEW + LAUNCH

TARGET AND BID

| AVAILABLE DAILY IMPRESSIONS: | MINIMUM BID: $1.50 |
|---|---|
| 201,865,793 | SUGGESTED BID: $1.65 - $1.80 |

TARGET BY GEOGRAPHY
CHOOSE THE GEOGRAPHICAL AREA WHERE YOU WANT YOUR AD SHOULD BE DISPLAYED.
○ DISPLAY ADS TO THE ENTIRE COUNTRY
● DISPLAY ADS ONLY TO SPECIFIC STATES/PROVINCES

AVAILABLE STATES     SELECTED STATES

ALABAMA     CALIFORNIA
ALASKA
ARIZONA
602 — ARKANSAS
COLORADO
CONNECTICUT
DELAWARE
DISTRICT OF COLUMBIA

DID YOU KNOW?
MORE SPECIFIC TARGETING MAY IMPROVE THE EFFICIENCY OF YOUR MARKETING ACTIVITY, BUT LIMITS YOUR AVAILABLE AUDIENCE AND INCREASES THE MINIMUM REQUIRED BID.

○ DISPLAY ADS ONLY TO SPECIFIC CITIES/DMAS

TARGET BY TYPE OF SITE
CHOOSE THE TYPES OF SITES WHERE YOU WANT YOUR ADS TO BE SHOWN.
● ALL TYPES OF SITES
○ SPECIFIC TYPES OF SITES ACROSS THE WEB
○ SPECIFIC SECTIONS OF AD NETWORK PROPERTIES

REPRESENTATIVE SITES
NETWORK MEMBERS CAN VIEW A LIST OF REPRESENTATIVE SITES WHERE A CAMPAIGN WOULD BE DISPLAYED. CREATE AN ACCOUNT OR LOGIN TO VIEW THE SITE LIST.

TARGET BY AUDIENCE
WHAT TYPES OF WEB VISITORS DO YOU WANT TO TARGET?
● ALL TYPES OF VISITORS
○ VISITORS WITH A SPECIFIC DEMOGRAPHIC ATTRIBUTE
○ VISITORS WITH A SPECIFIC INTEREST

SET YOUR MAXIMUM BID
MINIMUM BID:     SUGGESTED BID:
$1.50     $1.65 - $1.80

ENTER YOUR MAXIMUM BID*     $ [1.50]    PER THOUSAND IMPRESSIONS

[NEXT]

*FIG. 6*

| SET UP CAMPAIGN | TARGET | TARGET + BID | SET BUDGET | ADD BANNERS | CREATE ACCOUNT | REVIEW + LAUNCH |

TARGET AND BID

| | AVAILABLE DAILY IMPRESSIONS: | MINIMUM BID: $2.00 |
|---|---|---|
| | 179,128,854 | SUGGESTED BID: $2.20 - $2.40 |

TARGET BY GEOGRAPHY
CHOOSE THE GEOGRAPHICAL AREA WHERE YOUR AD SHOULD BE DISPLAYED.
○ DISPLAY ADS TO THE ENTIRE COUNTRY
○ DISPLAY ADS ONLY TO SPECIFIC STATES/PROVINCES
● DISPLAY ADS ONLY TO SPECIFIC CITIES/DMAS

DID YOU KNOW?
MORE SPECIFIC TARGETING MAY IMPROVE THE EFFICIENCY OF YOUR MARKETING ACTIVITY, BUT LIMITS YOUR AVAILABLE AUDIENCE AND INCREASES THE MINIMUM REQUIRED BID.

| AVAILABLE DMAS | | SELECTED DMAS |
|---|---|---|
| AK-ANCHORAGE | | CA-LOS ANGELES |
| AL-BIRMINGHAM | | |
| AL-MOBILE/PENSACOLA FL | » | |
| AL-HUNTSVILLE | « | |
| AR-LITTLE ROCK/PINE BLUFF | | |
| AZ-TUCSON | | |
| AZ-PHOENIX | | |
| CA-FREZNO | | |

702

TARGET BY TYPE OF SITE
CHOOSE THE TYPES OF SITES WHERE YOU WANT YOUR ADS TO BE SHOWN.
● ALL TYPES OF SITES
○ SPECIFIC TYPES OF SITES ACROSS THE WEB
○ SPECIFIC SECTIONS OF AD NETWORK PROPERTIES

REPRESENTATIVE SITES
NETWORK MEMBERS CAN VIEW A LIST OF REPRESENTATIVE SITES WHERE A CAMPAIGN WOULD BE DISPLAYED. CREATE AN ACCOUNT OR LOGIN TO VIEW THE SITE LIST.

TARGET BY AUDIENCE
WHAT TYPES OF WEB VISITORS DO YOU WANT TO TARGET?
● ALL TYPES OF VISITORS
○ VISITORS WITH A SPECIFIC DEMOGRAPHIC ATTRIBUTE
○ VISITORS WITH A SPECIFIC INTEREST

SET YOUR MAXIMUM BID
MINIMUM BID: $2.00     SUGGESTED BID: $2.20 - $2.40

ENTER YOUR MAXIMUM BID*  $ [2.00] PER THOUSAND IMPRESSIONS

[NEXT]

| SET UP CAMPAIGN | TARGET + BID | SET BUDGET | ADD BANNERS | CREATE ACCOUNT | REVIEW + LAUNCH |

| TARGET AND BID | AVAILABLE DAILY IMPRESSIONS: | MINIMUM BID: $4.50 |
|---|---|---|
| | 27,160,983 | SUGGESTED BID: $4.95 - $5.40 |

TARGET BY GEOGRAPHY
CHOOSE THE GEOGRAPHICAL AREA WHERE YOUR AD SHOULD BE DISPLAYED.
- ⦿ DISPLAY ADS TO THE ENTIRE COUNTRY
- ○ DISPLAY ADS ONLY TO SPECIFIC STATES/PROVINCES
- ○ DISPLAY ADS ONLY TO SPECIFIC CITIES/DMAS

DID YOU KNOW?
MORE SPECIFIC TARGETING MAY IMPROVE THE EFFICIENCY OF YOUR MARKETING ACTIVITY, BUT LIMITS YOUR AVAILABLE AUDIENCE AND INCREASES THE MINIMUM REQUIRED BID.

TARGET BY TYPE OF SITE
CHOOSE THE TYPES OF SITES WHERE YOU WANT YOUR ADS TO BE SHOWN.
- ○ ALL TYPES OF SITES
- ⦿ SPECIFIC TYPES OF SITES ACROSS THE WEB

REPRESENTATIVE SITES
NETWORK MEMBERS CAN VIEW A LIST OF REPRESENTATIVE SITES WHERE A CAMPAIGN WOULD BE DISPLAYED. CREATE AND ACCOUNT OR LOGIN TO VIEW THE SITE LIST.

802

SELECT ONE
- ○ AUTOMOTIVE
- ○ BUSINESS
- ○ CASUAL GAMING
- ○ EDUCATION
- ○ EMAIL
- ○ ENTERTAINMENT
- ○ FOOD
- ○ FUN LOVING
- ○ HEALTH
- ○ HISPANIC
- ○ LIFESTYLE
- ○ MEN
- ○ MOVIES
- ○ MUSIC
- ○ NEWS
- ○ PARENTING
- ○ PERSONAL FINANCE
- ○ REAL ESTATE
- ○ SOCIAL NETWORKING
- ○ SPORTS
- ○ TECHNOLOGY
- ○ TEENS
- ○ TRAVEL
- ○ TV
- ○ VIDEO GAMES
- ○ WEATHER
- ○ WOMEN

○ SPECIFIC SECTIONS OF AD NETWORK PROPERTIES

TARGET BY AUDIENCE
WHAT TYPES OF WEB VISITORS DO YOU WANT TO TARGET?
- ⦿ ALL TYPES OF VISITORS
- ○ VISITORS WITH A SPECIFIC DEMOGRAPHIC ATTRIBUTE
- ○ VISITORS WITH A SPECIFIC INTEREST

SET YOUR MAXIMUM BID
MINIMUM BID: $4.50   SUGGESTED BID: $4.95 - $5.40

ENTER YOUR MAXIMUM BID* $ [4.50] PER THOUSAND IMPRESSIONS

[NEXT]

FIG. 9

SET UP CAMPAIGN | TARGET + BID | SET BUDGET | ADD BANNERS | CREATE ACCOUNT | REVIEW + LAUNCH

| | AVAILABLE DAILY IMPRESSIONS: | MINIMUM BID: $1.00 |
|---|---|---|
| | 1,585,748,569 | SUGGESTED BID: $1.10 - $1.20 |

TARGET AND BID

TARGET BY GEOGRAPHY
CHOOSE THE GEOGRAPHICAL AREA WHERE YOUR AD SHOULD BE DISPLAYED.
- ◉ DISPLAY ADS TO THE ENTIRE COUNTRY
- ○ DISPLAY ADS ONLY TO SPECIFIC STATES/PROVINCES
- ○ DISPLAY ADS ONLY TO SPECIFIC CITIES/DMAS

DID YOU KNOW?
MORE SPECIFIC TARGETING MAY IMPROVE THE EFFICIENCY OF YOUR MARKETING ACTIVITY, BUT LIMITS YOUR AVAILABLE AUDIENCE AND INCREASES THE MINIMUM REQUIRED BID.

TARGET BY TYPE OF SITE
CHOOSE THE TYPES OF SITES WHERE YOU WANT YOUR ADS TO BE SHOWN.
- ○ ALL TYPES OF SITES
- ○ SPECIFIC TYPES OF SITES ACROSS THE WEB
- ◉ SPECIFIC SECTIONS OF AD NETWORK PROPERTIES

BECAUSE OUR SECTIONS ALLOW YOU TO PICK A SPECIFIC PLACEMENT, THERE IS NOT A LIST OF REPRESENTATIVE SITES FOR THESE OPTIONS.

SELECT ONE
- ○ AOL-18-34
- ○ AOL-AGE 35 PLUS
- ○ AOL-FEMALE
- ○ AOL-MALE
- ○ AOL AUTOS
- ○ AOL BLACK VOICES
- ○ AOL CITY GUIDE
- ○ AOL EMAIL
- ○ AOL ENTERTAINMENT (NO TMZ)
- ○ AOL ENTERTAINMENT AND TMZ
- ○ AOL FINANCE
- ○ AOL HEALTH
- ○ AOL LATINO
- ○ AOL NEWS
- ○ AOL SPORTS
- ○ AOL TECHNOLOGY
- ○ AOL TRAVEL
- ○ AOL.COM (RUN OF SITE)
- ○ BEBO.COM
- ○ LEMON DROP
- ○ USERPLANE

— 902

TARGET BY AUDIENCE
WHAT TYPES OF WEB VISITORS DO YOU WANT TO TARGET?
- ◉ ALL TYPES OF VISITORS
- ○ VISITORS WITH A SPECIFIC DEMOGRAPHIC ATTRIBUTE
- ○ VISITORS WITH A SPECIFIC INTEREST

SET YOUR MAXIMUM BID
MINIMUM BID: $1.00    SUGGESTED BID: $1.10 - $1.20

ENTER YOUR MAXIMUM BID*  $ [2.00]  PER THOUSAND IMPRESSIONS

[NEXT]

| SET UP CAMPAIGN | TARGET + BID | SET BUDGET | ADD BANNERS | CREATE ACCOUNT | REVIEW + LAUNCH |

| AVAILABLE DAILY IMPRESSIONS: | MINIMUM BID:$1.00 |
|---|---|
| 1,585,748,569 | SUGGESTED BID: $1.10 - $1.20 |

TARGET AND BID

TARGET BY GEOGRAPHY
CHOOSE THE GEOGRAPHICAL AREA WHERE YOUR AD SHOULD BE DISPLAYED.
- ⦿ DISPLAY ADS TO THE ENTIRE COUNTRY
- ○ DISPLAY ADS ONLY TO SPECIFIC STATES/PROVINCES
- ○ DISPLAY ADS ONLY TO SPECIFIC CITIES/DMAS

DID YOU KNOW?
MORE SPECIFIC TARGETING MAY IMPROVE THE EFFICIENCY OF YOUR MARKETING ACTIVITY, BUT LIMITS YOUR AVAILABLE AUDIENCE AND INCREASES THE MINIMUM REQUIRED BID.

TARGET BY TYPE OF SITE
CHOOSE THE TYPES OF SITES WHERE YOU WANT YOUR ADS TO BE SHOWN.
- ⦿ ALL TYPES OF SITES
- ○ SPECIFIC TYPES OF SITES ACROSS THE WEB
- ○ SPECIFIC SECTIONS OF AD NETWORK PROPERTIES

REPRESENTATIVE SITES
BECAUSE OUR NETWORK CHANGES EVERY DAY, WE CANNOT GUARANTEE PLACEMENT ON ANY SPECIFIC SITE.

TARGET BY AUDIENCE
WHAT TYPES OF WEB VISITORS DO YOU WANT TO TARGET?
- ○ ALL TYPES OF VISITORS
- ⦿ VISITORS WITH A SPECIFIC DEMOGRAPHIC ATTRIBUTE

GENDER
⦿ BOTH MALE AND FEMALE    ○ ONLY MALE    ○ ONLY FEMALE

AGE
⦿ TARGET ALL AGES    ○ 18-24  ○ TARGET ONLY CERTAIN AGES
                     ○ 25-34  ○ 35-44  ○ 55-64
                              ○ 45-54  ○ 65+

○ VISITORS WITH A SPECIFIC INTEREST

1002

SET YOUR MAXIMUM BID
MINIMUM BID:    SUGGESTED BID:
$1.00           $1.10 -$1.20

ENTER YOUR MAXIMUM BID*   $ [2.00] PER THOUSAND IMPRESSIONS

[NEXT]

*FIG. 10*

SET UP CAMPAIGN | TARGET + BID | SET BUDGET | ADD BANNERS | CREATE ACCOUNT | REVIEW + LAUNCH

TARGET AND BID

| AVAILABLE DAILY IMPRESSIONS: | MINIMUM BID: $1.00 |
|---|---|
| 1,585,748,569 | SUGGESTED BID: $1.10 - $1.20 |

TARGET BY GEOGRAPHY
CHOOSE THE GEOGRAPHICAL AREA WHERE YOUR AD SHOULD BE DISPLAYED.
- ⦿ DISPLAY ADS TO THE ENTIRE COUNTRY
- ○ DISPLAY ADS ONLY TO SPECIFIC STATES/PROVINCES
- ○ DISPLAY ADS ONLY TO SPECIFIC CITIES/DMAS

DID YOU KNOW?
MORE SPECIFIC TARGETING MAY IMPROVE THE EFFICIENCY OF YOUR MARKETING ACTIVITY, BUT LIMITS YOUR AVAILABLE AUDIENCE AND INCREASES THE MINIMUM REQUIRED BID.

TARGET BY TYPE OF SITE
CHOOSE THE TYPES OF SITES WHERE YOU WANT YOUR ADS TO BE SHOWN.
- ⦿ ALL TYPES OF SITES
- ○ SPECIFIC TYPES OF SITES ACROSS THE WEB
- ○ SPECIFIC SECTIONS OF AOL.COM AND OTHER AOL PROPERTIES

REPRESENTATIVE SITES
NETWORK MEMBERS CAN VIEW A LIST OF REPRESENTATIVE SITES WHERE A CAMPAIGN WOULD BE DISPLAYED. CREATE AN ACCOUNT OR LOGIN TO VIEW THE SITE LIST.

TARGET BY AUDIENCE
WHAT TYPES OF WEB VISITORS DO YOU WANT TO TARGET?
- ○ ALL TYPES OF VISITORS
- ○ VISITORS WITH A SPECIFIC DEMOGRAPHIC ATTRIBUTE
- ⦿ VISITORS WITH A SPECIFIC INTEREST

SELECT ONE — 1102
- ○ AUTO
- ○ BLACK VOICES
- ○ COOKING
- ○ DIET & FITNESS
- ○ ENTERTAINMENT
- ○ GAMES
- ○ HOME
- ○ MOBILE
- ○ MONEY
- ○ MOVIES
- ○ MUSIC
- ○ PARENTING
- ○ REAL ESTATE
- ○ SHOPPING
- ○ SMALL BUSINESS
- ○ SPORTS
- ○ TECHNOLOGY
- ○ TELEVISION
- ○ TRAVEL
- ○ WOMEN

SET YOUR MAXIMUM BID
MINIMUM BID: $1.00   SUGGESTED BID: $1.10 - $1.20

ENTER YOUR MAXIMUM BID*  $ [2.00]  PER THOUSAND IMPRESSIONS

[NEXT]

| SET UP CAMPAIGN | TARGET + BID | SET BUDGET | ADD BANNERS | CREATE ACCOUNT | REVIEW + LAUNCH | | |
|---|---|

SET BUDGET
SET YOU MAXIMUM DAILY BUDGET

ENTER YOUR TARGET DAILY BUDGET. WE OFFER A BUDGET GUARANTEE - YOU WILL NEVER BE CHARGED MORE THAN YOUR DAILY BUDGET, EVEN IF WE DELIVER MORE IMPRESSIONS OR CLICKS THAN BUDGETED.

ENTER YOUR DAILY BUDGET*   [$750]   PER DAY  ～1202
                                    DAILY MINIMUM:$10

| AVAILABLE DAILY IMPRESSIONS: | YOUR BID: |
| 1,585,748,569 | $1.00 |

DID YOU KNOW?
WE WILL ONLY CHARGE YOU FOR YOUR SPEND AS YOU ACCUMULATE IT, AND YOU CAN CHANGE YOUR DAILY BUGET AT ANY TIME.

[NEXT]

*FIG. 12*

SET UP CAMPAIGN | TARGET + BID | SET BUDGET | ADD BANNERS | CREATE ACCOUNT | REVIEW + LAUNCH

ADD BANNERS
ADD BANNERS ADS TO YOUR CAMPAIGN

| UPLOAD A FILE | NEW!<br>BUILD YOUR OWN BANNER | USE A<br>THIRD-PARTY TAG |
|---|---|---|

1306

TO BUILD YOUR OWN BANNER IN MINUTES USING OUR FREE BANNER BUILDER TOOL, JUST ENTER A NAME FOR YOUR BANNER AND ITS CLICK-THROUGH URL. THEN CLICK LAUNCH BANNER BUILDER TO GO TO BANNER BUILDER. WHEN YOU FINISH YOUR BANNER, YOU WILL BE BROUGHT BACK TO THIS PAGE, WHERE YOU CAN BUILD MORE BANNERS OR PROCEED TO THE NEXT STEP.

NAME THIS BANNER *    [ NVG 3 ]
                      MAX 20 CHARACTERS

1502

THIRD-PARTY SERVER *    [ ........ ▼ ]

BANNER SIZE *    [ 728X90 ▼ ]

THIRD-PARTY CODE *    [ ........ ]

[ SAVE ]

| BANNER NAME | DIMENSIONS | |
|---|---|---|
| NVG BANNER | 728X90 | DELETE |
| NVG 3 | 728X90 | DELETE |

YOU SHOULD KNOW

Every campaign must include at least one 728x90 banner.

The more sizes uploaded, the more impressions a campaign is eligible to receive.

Please make sure there is a border on every banner. A border can be created either by a contrast in color from white or by a frame.

See our Ad Banner Guidelines for details.

[ NEXT ]

*FIG. 15*

| SET UP CAMPAIGN | TARGET + BID | SET BUDGET | ADD BANNERS | CREATE ACCOUNT | REVIEW + LAUNCH |

CREATE ACCOUNT

ACCOUNT INFORMATION

PLEASE ENTER YOUR ACCOUNT AND BILLING INFO BELOW.
WE WILL CHARGE A ONE-TIME FEE OF $5 TO CREATE YOUR ACCOUNT. IF YOU CREATE ADDITIONAL CAMPAIGNS IN THE FUTURE UNDER THIS ACCOUNT, YOU WILL NOT NEED TO PAY THIS FEE AGAIN. THIS AMOUNT IS NON-REFUNDABLE ONCE YOU COMPLETE YOUR ORDER.

| Field | Value | Note |
|---|---|---|
| EMAIL ADDRESS * | PKOSZTOLNIK@NVG-INC.COM | |
| PASSWORD * | ******** | MUST BE 8-15 CHARACTERS LONG |
| CONFIRM PASSWORD * | ******** | MUST BE 8-15 CHARACTERS LONG |

DID YOU KNOW?
THIS IS THE EMAIL ADDRESS AND PASSWORD THAT YOU WILL USE TO LOG IN TO CHECK YOUR CAMPAIGN STATS, ACCESS CUSTOMER SERVICE, AND CREATE NEW CAMPAIGNS IN THE FUTURE.

PERSONAL INFORMATION

| Field | Value | |
|---|---|---|
| FIRST NAME * | PETER | |
| LAST NAME * | KOSZTOLNIK | |
| COMPANY NAME * | NVG | |
| BUSINESS URL * | HTTP://WWW.NVG-INC.COM | E.G. HTTP://WWW.MYWEBSITE.COM |
| PHONE NUMBER | 1* E.G. 333-222-1111 | |
| INDUSTRY TYPE * | BUSINESS MARKETING | |
| COUNTRY * | UNITED STEATES | |

| Field | Value |
|---|---|
| ADDRESS * | 3251 OLD LEE HWY |
| ADDRESS LINE 2 | SUITE 204 |
| CITY/TOWN * | FAIRFAX |
| STATE/PROVINCE/REGION * | VA |
| ZIP/POSTAL CODE * | 22030 |

BILLING ADDRESS

☐ USE THE SAME INFORMATION FOR BILLING?

| Field | Value |
|---|---|
| COUNTRY * | |
| ADDRESS * | |
| ADDRESS LINE 2 | |
| CITY/TOWN * | |
| STATE/PROVINCE/REGION * | |
| ZIP/POSTAL CODE * | |

BILLING INFORMATION

| Field | Value | |
|---|---|---|
| CREDIT CARD TYPE * | ******** | |
| CREDIT CARD NUMBER * | ******** | |
| CVV * | ******** | WHAT'S THIS? |
| EXPIRATION DATE * | ******** | |
| CARDHOLDER'S NAME * | ******** | |
| PROMO CODE | ******** | APPLY PROMO CODE |

ACCEPTED CARDS
VISA, MASTER CARD AND AMERICAN EXPRESS

WHEN WILL I BE CHARGED?
YOUR CREDIT CARD WILL BE CHARGED $5 WHEN YOU COMPLETE THIS ORDER.
AFTER THAT, IT WILL BE CHARGED WHEN YOU ACCUMULATE CERTAIN THRESHOLDS OF SPEND ON YOUR CAMPAIGN, AND AGAIN AT THE END OF EACH MONTH TO CLEAR YOUR BALANCE.
PLEASE VISIT OUR HELP PAGE FOR DETAILS ABOUT BILLING

TERMS AND CONDITIONS

☐ I ACCEPT THESE TERMS AND CONDITIONS AND PRIVACY POLICY.
☐ I AUTHORIZE YOU TO SEND ME OCCASSIONAL EMAIL UPDATES ON NEW FEATURES OF THIS SERVICE AND OTHER RELATED OFFERS.
☐ I AUTHORIZE YOU TO CHARGE ONE-TIME FEE OF $5 TO CREATE MY ACCOUNT. I UNDERSTAND THAT THIS AMOUNT IS NON-REFUNDABLE.

[NEXT]

*FIG. 16*

SET UP CAMPAIGN | TARGET + BID | SET BUDGET | ADD BANNERS | CREATE ACCOUNT | REVIEW + LAUNCH

REVIEW AND LAUNCH

REVIEW CAMPAIGN
PLEASE REVIEW ALL OF THE INFORMATION ON THIS PAGE. ONCE YOU ARE READY TO LAUNCH YOUR CAMPAIGN, PLEASE CLICK THE "COMPLETE PURCHASE" BUTTON.

PATENT CAMPAIGN EDIT

TARGETING AND BIDDING DETAILS
| | | |
|---|---|---|
| GEOGRAPHY | UNITED STATES | EDIT |
| TYPES OF SITES | NEWS | EDIT |
| AUDIENCE | ALL AUDIENCES | EDIT |

BUDGET DETAILS
| | | |
|---|---|---|
| CAMPAIGN TYPE | CPC | EDIT |
| YOUR MAXIMUM BID | $0.75 | EDIT |
| YOUR DAILY BUDGET | $10/DAY | EDIT |

BANNERS
| BANNER NAME | DIMENSIONS | FILE SIZE | CLICK-THROUGH URL |
|---|---|---|---|
| NVG BANNER | 728X90 | 46KB | HTTP://WWW.NVG-INC.COM |

[ COMPLETE PURCHASE ]

DID YOU KNOW?
ONCE YOU CLICK "COMPLETE PURCHASE", YOUR CAMPAIGN WILL BE REVIEWED BY OUR NETWORK QUALITY TEAM WITHIN 2 BUSINESS DAYS.

IF IT MEETS OUR BUSINESS AND BANNER GUIDELINES, YOUR CAMPAIGN WILL BE ACTIVATED AND YOUR BANNERS WILL START SHOWING ON OUR NETWORK. YOU WILL RECEIVE AN EMAIL FROM US ONCE THE CAMPAIGN HAS BEEN REVIEWED.

*FIG. 17*

ACCOUNT | LOGOUT

| MY CAMPAIGN | REPORTS | SEARCH CAMPAIGNS |

CAMPAIGN PERFORMANCE

CAMPAIGN SUMMARY: ORDER #1

PERFORMANCE: DAYTIME TELEVISION

EXPORT TO EXCEL

☐ REPORT SETTINGS — 1802

TIME PERIOD  MONTH TO DATE ▼
REPORT ON    FULL CAMPAIGN ▼
FORMAT       ● TABLE  ○ CHART
TIME ZONE    EST                1804

VIEWPOINT

☐ CAMPAIGN TOTALS — 1806

IMPRESSIONS  14,456,125
CLICKS       6,654
CONVERSIONS  1,844
SPEND        8,000
CTR          0.04%
CVR          0.12%
CVN          0.2143
eCPA         $6.67
eCPC         $24.18

WHAT ARE THESE NUMBERS?

1808

☐ IMPRESSIONS FOR THE PAST 7 DAYS

[Chart: 60,000 / 40,000 / 20,000 / 0 on left axis; $0.45 / $0.30 / $0.15 / 0 on right axis; dates MAR 15, 2008 through MAR 21, 2008]

☐ IMPRESSIONS  ☐ PRICE  HIDE PRICE

☐ CLICKS FOR THE PAST 7 DAYS — 1810

[Chart: 3,000 / 2,000 / 1,000 / 0; dates MAR 15, 2008 through MAR 21, 2008]

▲ INCREASE IN CAMPAIGN PRICE  ▼ DECREASE IN CAMPAIGN PRICE
☐ CLICKS  SHOW PRICE

☐ CONVERSIONS FOR THE PAST 7 DAYS

☐ SPEND FOR THE PAST 7 DAYS

FIG. 18

SYSTEMS AND METHODS FOR ADMINISTERING AN ONLINE ADVERTISER BIDDING INTERFACE

RELATED APPLICATION

The present disclosure claims the benefit of priority of provisional patent application No. 61/099,483, filed on Sep. 23, 2008, by James Fellows, the disclosure of which is incorporated by reference herein in its entirety.

TECHNICAL FIELD

The embodiments of the present disclosure relate generally to online advertising. More specifically, the exemplary embodiments described herein relate to systems and methods for administering an online advertiser bidding interface, by which an advertiser may bid on online advertising inventory of an online publisher.

BACKGROUND

As greater numbers of people use the World Wide Web for communication, commerce, and other daily activities, they generate larger and larger volumes of traffic over the Internet. Because the benefits of commercializing the Internet can be tremendous, businesses increasingly take advantage of this traffic by advertising their products or services online. These advertisements may appear in the form of leased advertising space (e.g., "banners") on content websites, which are operated by "publishers" who control the website content, and the availability and cost of the advertising space or "ad inventory."

Advertisers of various products or services may create online advertising campaigns that include advertisements designed to be placed on content websites during a specified period of time. For example, an automobile company may design several advertisements for a new model and may wish to have the advertisements placed online during a period surrounding the launch of the new model. Each time one of the advertisements is shown to a viewer of the website is known as an "impression." When shown the advertisement, the user may select, or "click," on the advertisement or may take another "action" such as completing an online form to request more information. If the user later purchases the new model of automobile, the purchase is referred to as a "conversion" of the impression. Advertisers may pay owners of content Web sites (i.e., the publishers) based on, for example, the number of impressions, clicks, or conversions over the course of an advertising campaign.

In some cases, an advertiser may have a marketing plan that identifies certain types of people as being target audience members for a given product or service. For example, the advertiser may wish to spend money only on users having certain demographics or personal interests. In addition, a company may want to determine a bid price, which represents the highest price that the company is willing to pay for placing an advertisement on a particular website, or displaying to a particular Internet user. The determination of a bid price may help companies, and those obtaining advertising space on their behalf, to assess the potential benefit of placing a particular advertisement on a particular web page at a particular time, etc.

Traditionally, companies would pay per impression, per click, and/or per conversion, regardless of whether or not the action for which they are paying (e.g., impressions, clicks, etc.) is the action that benefits them. Advertisers were able to provide particular designs for banner ads (i.e., "creatives") to third party advertising networks, for display on publishers' web sites. However, the advertisers were not able to control which sites within the network the creatives were displayed upon. Moreover, the advertisers were not able to control which groups of people were shown their creatives. For example, advertisers could not select specific demographic or behavioral characteristics of people desired to be shown the advertisers' creatives. As a result, advertisers were forced to pay for ad delivery to suboptimal populations of web users, publishers were unable to maximize the value of their web inventory, and third party networks were unable to fully leverage the relationships between advertiser interests and publisher assets.

Therefore, advertisers may wish to obtain very specific information about the types of consumers viewing various types of web sites and responding to their advertisements. In some cases, advertisers may be willing to spend more money per impression, click, or conversion for delivery to those consumers having desired demographics or personal interests. As a result, publishers of content websites and/or facilitators of third party advertising networks may wish to obtain as much information as possible about consumers and other users traveling between web pages associated with an advertising network.

The present disclosure is directed to solving one or more of the above-referenced problems by administering an online advertiser bidding interface.

SUMMARY

In accordance with one disclosed exemplary embodiment, a computer-implemented method is provided for administering an online advertiser bidding interface. The method includes providing a bidding interface to an advertiser through a web server, by which an advertiser may bid on online advertising inventory of an online publisher, the bidding interface displaying a plurality of targeting elements; receiving targeting information from the advertiser through the targeting elements of the bidding interface and the web server; and generating an advertising bid based on the received targeting information.

In accordance with another exemplary embodiment, a system is provided for administering an online advertiser bidding interface. The system includes a web server configured to: provide a bidding interface to an advertiser, by which an advertiser may bid on online advertising inventory of an online publisher, the bidding interface displaying a plurality of targeting elements; and receive targeting information from the advertiser through the targeting elements of the bidding interface.

In accordance with another exemplary embodiment, a computer-readable storage medium is provided for storing a computer program which, when executed by a computer, causes the computer to perform a method of administering an online advertiser bidding interface. The method includes providing a bidding interface to an advertiser through a web server, by which an advertiser may bid on online advertising inventory of an online publisher, the bidding interface displaying a plurality of targeting elements; receiving targeting information from the advertiser through the targeting elements of the bidding interface and the web server; and generating an advertising bid based on the received targeting information.

BRIEF DESCRIPTION OF THE DRAWINGS

FIG. 5 depicts a screenshot of an exemplary targeting and bidding page of a bidding interface consistent with embodiments of the present disclosure;

FIG. 6 depicts a screenshot of an exemplary geographic targeting and bidding page of a bidding interface consistent with embodiments of the present disclosure;

FIG. 7 depicts a screenshot of another exemplary geographic targeting and bidding page of a bidding interface consistent with embodiments of the present disclosure;

FIG. 8 depicts a screenshot of an exemplary subject matter targeting and bidding page of a bidding interface consistent with embodiments of the present disclosure;

FIG. 9 depicts a screenshot of an exemplary site targeting and bidding page of a bidding interface consistent with embodiments of the present disclosure;

FIG. 10 depicts a screenshot of an exemplary demographic targeting and bidding page of a bidding interface consistent with embodiments of the present disclosure;

FIG. 11 depicts a screenshot of an exemplary user interest targeting and bidding page of a bidding interface consistent with embodiments of the present disclosure;

FIG. 12 depicts a screenshot of an exemplary budget setting page of a bidding interface consistent with embodiments of the present disclosure;

FIG. 15 depicts a screenshot of an exemplary third-party banner selecting page of a bidding interface consistent with embodiments of the present disclosure;

FIG. 16 depicts a screenshot of an exemplary account creation page of a bidding interface consistent with embodiments of the present disclosure;

FIG. 17 depicts a screenshot of an exemplary review and launch page of a bidding interface consistent with embodiments of the present disclosure; and FIG. 18 depicts a screenshot of an exemplary performance tracking page of a bidding interface consistent with embodiments of the present disclosure.

DETAILED DESCRIPTION OF THE DRAWINGS

Reference will now be made in detail to exemplary embodiments of the disclosure, examples of which are illustrated in the accompanying drawings. Wherever possible, the same reference numbers will be used throughout the drawings to refer to the same or like parts.

Figure 1:
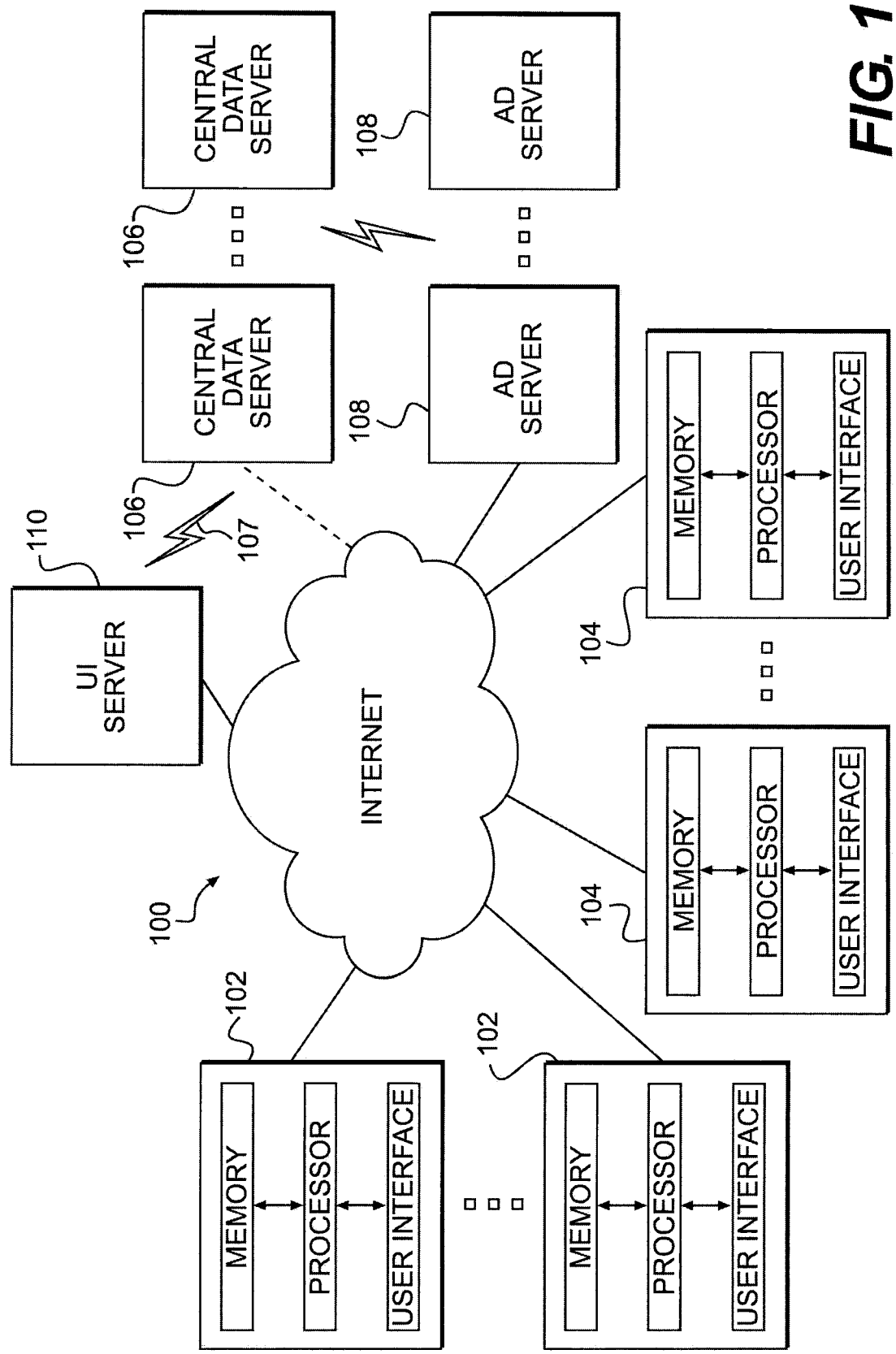
FIG. 1 depicts a block diagram of an exemplary system for administering an online advertiser bidding interface consistent with embodiments of the present disclosure.

FIG. 1 illustrates an exemplary system 100 for administering an online advertiser bidding interface. System 100 may include a plurality of advertisers 102, publishers 104, central data servers 106, ad servers 108, and a user interface ("UI") server 110, all disposed in communication with the Internet. As will be described in more detail below, in general, system 100 may be configured to create and administer an online advertiser bidding interface, by which advertisers 102 may bid on online ad inventory made available by publishers 104.

Advertisers 102 may include any entities having online advertisements (e.g., banner ads, pop-ups, etc.) desired to be delivered to online users. For example, advertisers 102 may have created advertisements relating to products or services marketable to one or more online users. Advertisers 102 may interact with publishers 104, central data servers 106, ad servers 108, and/or UI server 110 through computers connected to the Internet. As shown in FIG. 1, each advertiser 102 may interact with system 100 through a computer comprising, for example, a memory, processor, and user interface. Thus, advertisers 102 may be able to communicate advertising campaign information, such as ad information, targeting information, consumer information, budget information, bidding information, etc., to other entities in system 100.

Publishers 104 may include any entities having inventories of available online advertising space. For example, publishers 104 may include online content providers, search engines, e-mail programs, or any other online site or program having online user traffic. Publishers 104 may interact with advertisers 102, central data servers 106, ad servers 108, and/or UI server 110 via computers connected to the Internet. As shown in FIG. 1, each publisher 104 may interact with system 100 through a computer comprising, for example, a memory, processor, and user interface. Thus, publishers 104 may be able to communicate inventory information, such as banner space information, site information, demographic information, cost information, etc., to other entities in system 100.

User interface (UI) server 110 may be any type of server configured to generate and display a bidding interface to online advertisers 102. For example, UI server 110 may operate any desired web server software configured to deliver a particular web interface to advertisers 102. UI server 110 may comprise a plurality of servers, each configured to receive URL requests and information from advertisers 102, and deliver web pages to advertisers 102 in response to the requests. In one embodiment, UI server 110 may be configured to provide an interface through which advertisers 102 may send advertising and targeting information to an administrator and bid on online advertising inventory provided by publishers 104. In one embodiment, the bidding interface may be a graphical user interface ("GUI") having a plurality of UI elements, or "targeting elements," by which an advertiser may select and communicate advertising and targeting information to an administrator.

Central data servers 106 may include any types of servers configured to receive campaign advertising and targeting information from advertisers 102 through UI server 110, aggregate such information for a plurality of advertising campaigns, process campaign bidding information, and generate advertiser bids based on information submitted through UI server 110. Central data servers 106 may also be configured to send the generated advertiser bids to ad servers 108. In one embodiment, central data servers 106 may be disposed in communication with the Internet through a firewall. Alternatively, or additionally, central data servers 106 may be disposed in direct communication with UI server 110 through a communication channel 107, such as a wired or wireless connection or network.

Ad servers 108 may include any types of servers configured to process advertising and targeting information from advertisers 102 and/or site information from publishers 104, either directly or indirectly. In certain embodiments, ad servers 108 may be remote web servers that receive advertising information from advertisers 102 through UI server 110 and/or central data servers 106, and serve ads to be placed by publishers 104. Ad servers 108 may be configured to serve ads across various domains of publishers 104, for example, based on advertising and targeting information provided by advertisers 102. Ad servers 108 may also be configured to serve ads based on contextual targeting of web sites, search results, and/or user profile information. Ad servers 108 may be configured to generate delivery performance information in the form of, for example, behavioral logs, leadback logs, click logs, action logs, and impression logs, based on users' interactions with web sites and ads implemented by system 100. In one embodiment, UI server 110, central data servers 106, and ad servers 108 may be operated by one or more third-party ad networks or "administrators."

Figure 2:
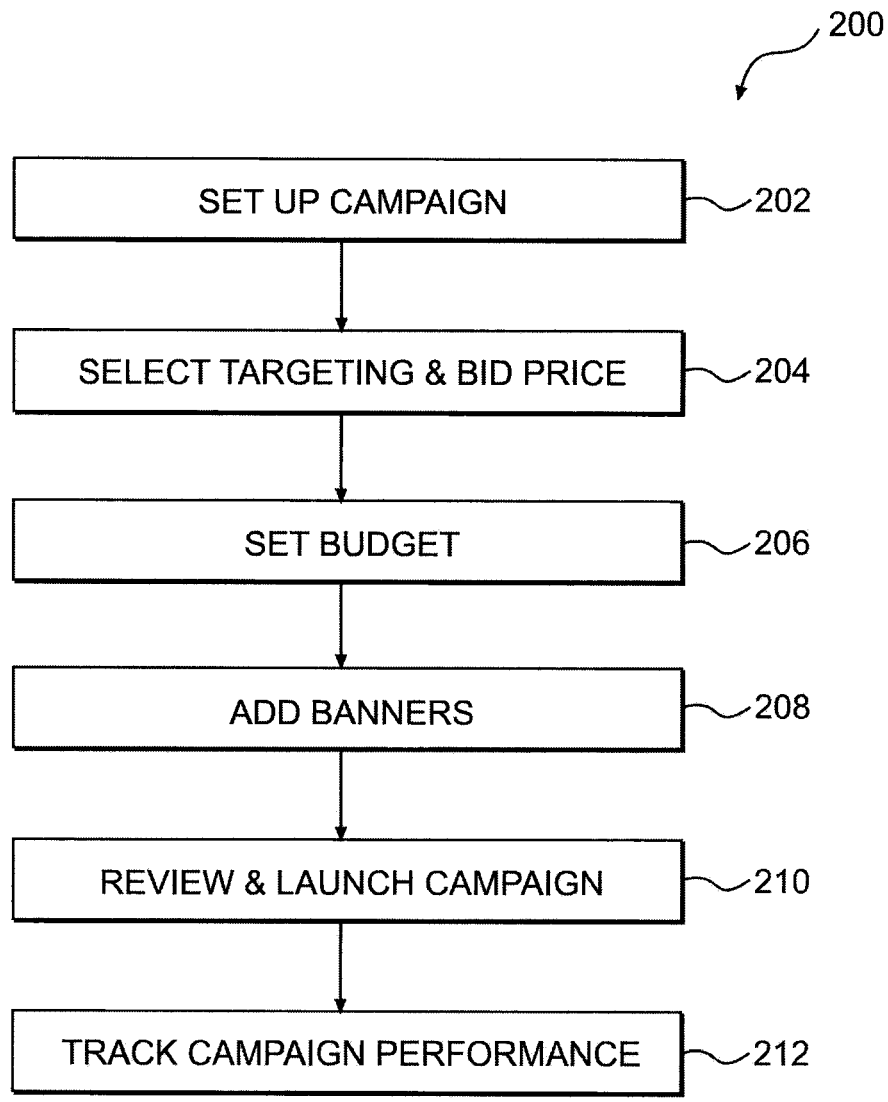
FIG. 2 depicts a flow chart of an exemplary method for initiating an online advertising campaign through a bidding interface consistent with embodiments of the present disclosure.
Figure 4:
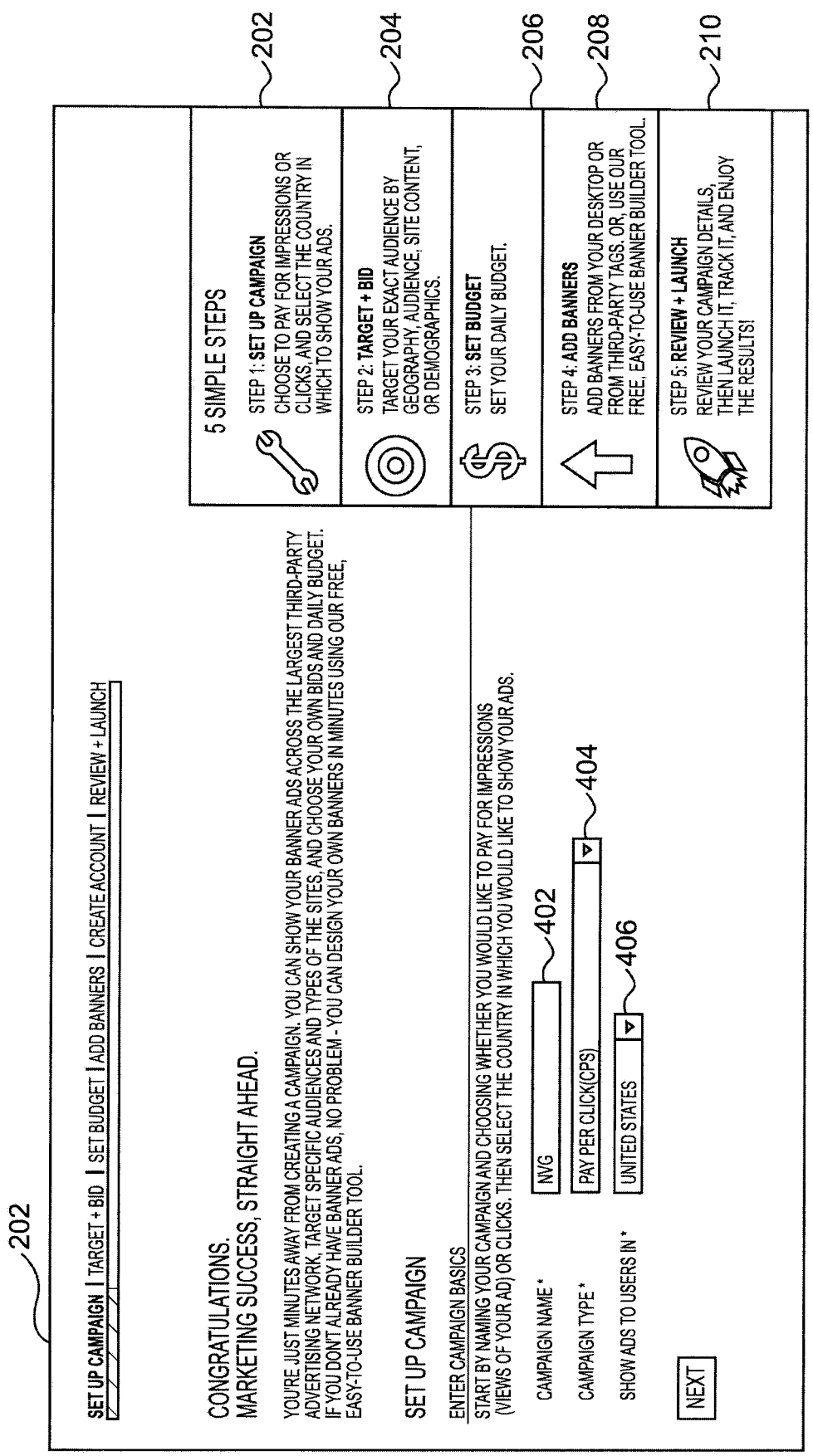
FIG. 4 depicts a screenshot of an exemplary introductory page of a bidding interface consistent with embodiments of the present disclosure.

FIG. 2 depicts an exemplary method 200, by which an advertiser may initiate an online advertising campaign through a bidding interface operated by an administrator. Specifically, advertisers may perform method 200 by requesting an instance of an advertiser bidding interface from UI server 110. Advertisers may then use method 200 to set up a campaign (step 202), select targeting and bid price (step 204), set a budget (step 206), add banners (208), review and launch the campaign (step 210), and track campaign performance (step 212). FIG. 4 depicts an exemplary screenshot of an advertiser bidding interface that can be sent by UI server 110 and received by an advertiser. In particular, FIG. 4 depicts how an advertiser may perform five (5) exemplary steps of method 200 to initiate an online advertising campaign through a bidding interface, as described in more detail with respect to FIGS. 4-18.

Figure 3:
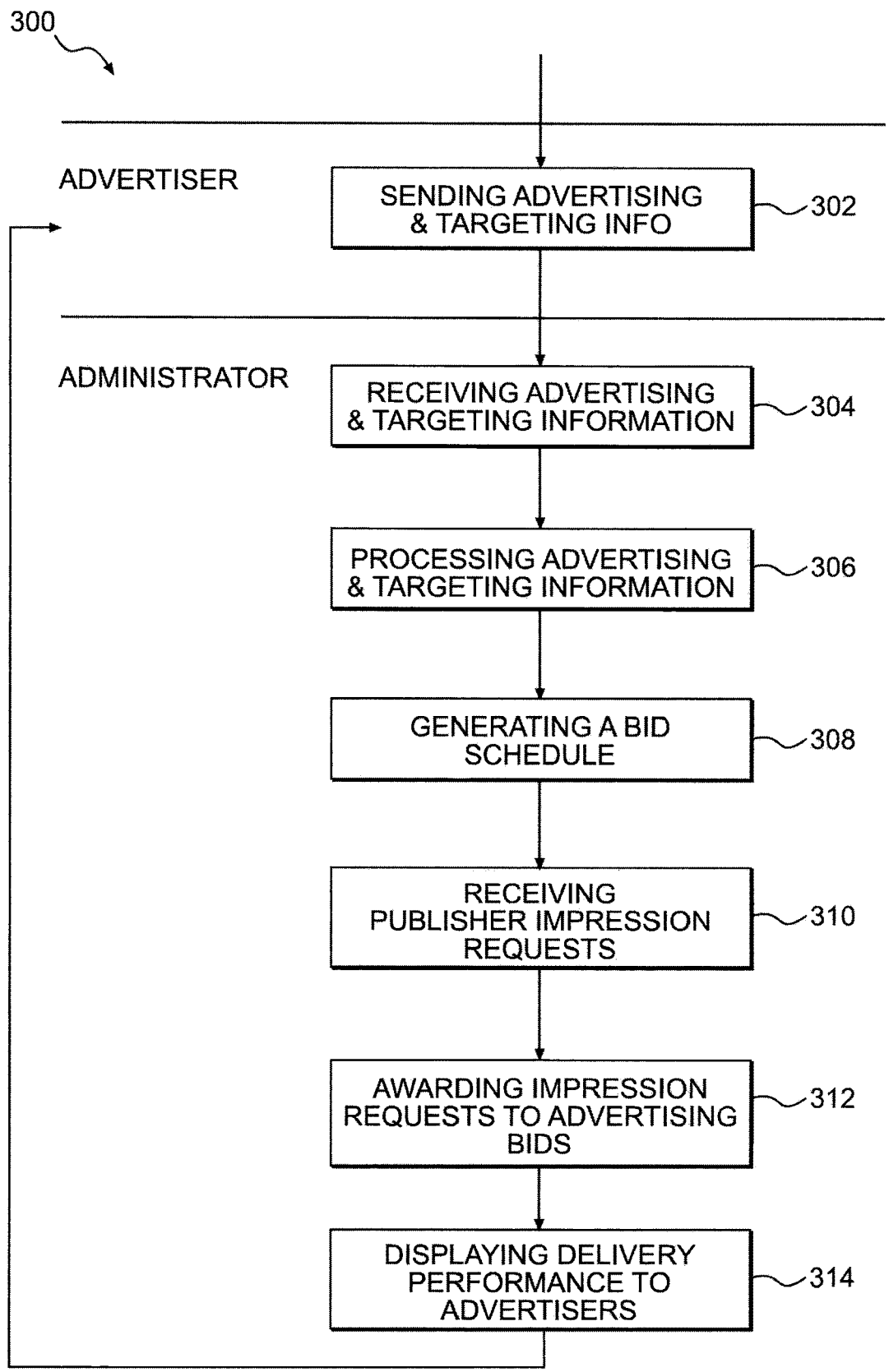
FIG. 3 depicts a flow chart of an exemplary method for administering an online advertising campaign based on advertiser interaction with a bidding interface consistent with embodiments of the present disclosure.

FIG. 3 depicts a flow chart of an exemplary method 300 for administering an online advertising campaign based on advertiser interaction with a bidding interface consistent with embodiments of the present disclosure. Method 300 may include an advertiser sending advertising and targeting information to an administrator (step 302). For example, an advertiser may send advertising and targeting information to an administrator through a bidding interface provided through UI server 110, by performing method 200 for initiating an online advertising campaign. In one embodiment, the advertising and targeting information may include, for example, at least one of a bid price, a geographic constraint, a site type constraint, an audience constraint, and/or a timing constraint, along with one or more ad banners, budget information, and/or account information. Method 300 may further include an administrator receiving the advertising and targeting information (step 304). For example, the administrator may receive the advertising and targeting information from an advertiser interacting with a bidding interface provided through UI server 110. Method 300 may further include processing the advertising and targeting information (step 306). In one embodiment, the administrator may pass the advertising and targeting information received through UI server 110 to central data servers 106. For example, the administrator may use any type of extensible markup language ("XML") associated with the bidding interface provided through UI server 110 to encode and push information to central data servers 106. The administrator may also or alternatively use a web application programming interface ("web API") to process the information and/or convert it to any format desired before pushing the information to central data servers 106. Central data servers 106 may receive and aggregate the advertising and targeting information received through the UI server 110 for any number of advertisers. Central data servers 106 may also receive advertising and targeting information, or any other ad campaign information, through any other interface or source. Central data servers 106 may therefore aggregate any advertising and targeting information for any number or type of advertising campaigns.

Method 300 of FIG. 3 may also include generating a bid schedule (step 308). For example, central data servers 106 may generate any number of advertising bids for each campaign initiated by an advertiser, based on advertising and targeting information provided by the advertiser. In one embodiment, each advertising bid may include a bid price, a geographic constraint, a site type constraint, an audience constraint, and/or a timing constraint. The method may also include receiving publisher impression requests from publishers (step 310). For example, each time an Internet user requests a web page having banner inventory from a publisher, the publisher may send an impression request to the administrator. The administrator may therefore compile bids generated based on advertiser-provided information, and impression requests based on publisher-provided information.

Method 300 of FIG. 3 may further include awarding impression requests to advertising bids based on the publisher-provided information and at least one of a bid price, a geographic constraint, a site type constraint, an audience constraint, and/or a timing constraint, as received from advertisers through the bidding interface (step 312). For example, in one embodiment, each time the administrator receives an impression request from a publisher, the administrator may filter out any bid requests that do not have their geographic constraints, site type constraints, audience constraints, and timing constraints satisfied by the impression request, thereby leaving a list of qualifying advertising bids. The administrator may then place the qualifying advertising bids in a bid table in a sequence based on the bid price associated with each advertising bid. The administrator may then award the impression request to the qualifying advertising bid having the highest bid price. The administrator may perform this method of awarding impression requests to advertising bids such that various geographical, site type, audience, and time constraints are satisfied, and that the qualifying advertising bids with the highest bid prices are awarded the impression requests. In some embodiments, the administrator may also employ various control methods, such as using bid allocation values and/or algorithms, to achieve desired timing and site spreading constraints, which result in awarding a qualifying advertising bid that does not have the highest bid price.

Method 300 of FIG. 3 may also include displaying delivery performance information to advertisers based on the results of the process of awarding impression requests (step 314). For example, the administrator may display the performance of an advertiser's online advertising campaign to the advertiser through the bidding interface delivered through UI server 110. In one embodiment, the administrator may display performance information including: the time period of the campaign, the total impressions, the total clicks, the total conversions, the total spend, the click-through rate (CTR), the conversion rate (CVR), the effective cost per action (eCPA), and/or the effective cost per click (eCPC). The administrator may also display such information graphically, such as the number of clicks, impressions, and/or conversions logged over time, for a given time period.

As described above, FIG. 4 depicts a screenshot of an exemplary introductory page of a web-based advertiser bidding interface that can be provided through UI server 110 and displayed to an advertiser 102 over the Internet. Exemplary embodiments of the pages associated with an advertiser bidding interface will now be described in detail with reference to FIGS. 4-18. As shown in FIG. 4, an advertiser may set up a campaign by entering a campaign name in UI element 402. An advertiser may select the type of advertising campaign using UI element 404, which in one embodiment may be a drop-down menu including the options of paying per thousand impressions (CPM) or paying per click (CPS). An advertiser may also choose to show ads to users in particular countries using UI element 406. As shown in FIG. 4, an advertiser may then perform the steps of setting up a campaign (step 202), selecting targeting and bid price (step 204), setting a budget (step 206), adding banners (208), and reviewing and launching the campaign (step 210).

FIG. 5 depicts a screenshot of an exemplary targeting and bidding page of the bidding interface, by which an advertiser may selectively target by geography using UI elements 502, target by type of site using UI elements 504, target by audience using UI elements 506, and/or set a maximum bid using UI element 512 (step 204). In one embodiment, an advertiser may manipulate one or more of UI elements 502, 504, 506, and 512 to selectively create targeting and bidding information to be sent to the administrator through UI server 110. As shown in FIG. 5, the administrator may send impression and bidding information to the advertiser in the form of the available daily impressions 514, a minimum bid 508, and/or a suggested bid 510. As an advertiser manipulates UI elements 502, 504, 506, and 512 to modify the targeting and bidding information, the displayed available daily impressions 514, minimum bid 508, and/or suggested bid 510 may be updated in real time to reflect those values associated with the targeting and bidding information input by the advertiser. For example, in one embodiment, as an advertiser reduces the geographical area, site type, and/or audience to which ads may be delivered, the number of available daily impressions 514 may decrease, and the minimum bid 508 and suggested bid 510 may increase. These dynamics may reflect the fact that as advertisers constrain the geography, site type, and audience type, the number of impression requests satisfying those constraints will naturally reduce, and that those impression requests should become more effective and valuable for the advertiser.

FIG. 6 depicts a screenshot of an exemplary geographic targeting and bidding page of a bidding interface that may be displayed to an advertiser through UI server 110. In particular, the targeting and bidding page may include a UI element 602, through which an advertiser may constrain ad delivery to one or more of the available states in an ad network. In addition, FIG. 7 depicts a screenshot of an exemplary geographic targeting and bidding page having a UI element 702, through which an advertiser may constrain ad delivery to one or more of the available cities in an ad network. Of course, geographical area may be divided, displayed, and selected based on any other category or segment of geography, such as region or municipality.

FIG. 8 depicts a screenshot of an exemplary subject matter targeting and bidding page of a bidding interface that may be displayed to an advertiser through UI server 110. In particular, the targeting and bidding page may include a UI element 802, through which an advertiser may constrain ad delivery to sites with particular types of subject matter or content. Similarly, FIG. 9 depicts a screenshot of an exemplary site targeting and bidding page including a UI element 902, through which an advertiser may constrain ad delivery to certain pre-determined sections of the ad network, based on specific sites or categories of sites in the network.

FIG. 10 depicts a screenshot of an exemplary demographic targeting and bidding page of a bidding interface that may be displayed to an advertiser through UI server 110. In particular, the targeting and bidding page may include a UI element 1002, through which an advertiser may constrain ad delivery to Internet users or "visitors" with specific demographic attributes, such as by gender, age, and/or socio-economic characteristics. Likewise, FIG. 11 depicts a screenshot of an exemplary user interest targeting and bidding page of a bidding interface having a UI element 1102, through which an advertiser may constrain ad delivery to visitors with specific subject matter interests.

Geographic, site type, and audience information for delivered ad impressions may be determined by the administrator through any desirable means, such as directly from publishers or Internet users, through contextual fetching and analysis of web pages, through cookie-obtained information, and/or from user information provided through registration with the ad network (e.g., for Internet and/or e-mail access). In addition, each of the geographic, site type, and audience categories discussed above and depicted in FIGS. 6-11 may be divided and/or further sub-divided by any alternative categories or types of categories, as desired.

FIG. 12 depicts a screenshot of an exemplary budget setting page of a bidding interface that may be displayed to an advertiser through UI server 110. As shown in FIG. 12, the budget setting page may include a UI element 1202, through which an advertiser may set a daily budget (step 206).

Figure 13:
FIG. 13 depicts a screenshot of an exemplary banner adding page of a bidding interface consistent with embodiments of the present disclosure.

FIG. 13 depicts a screenshot of an exemplary banner adding page of a bidding interface that may be displayed to an advertiser through UI server 110. As shown in FIG. 13, an advertiser may manipulate the banner adding page to add banners that can be associated with the advertising bids of the campaign being initiated by the advertiser (step 208). In one embodiment, an advertiser may select between uploading a banner file using UI element 1302, building a banner using UI element 1304, and/or using a third-party tag using UI element 1306. In particular, an advertiser may use UI element 1302 to upload an image file for the banner from the advertiser's computer. The advertiser may also select the banner size, name the banner, and select a click-through URL using UI element 1310. The advertiser may upload and/or create any desired number of banners, which may be displayed as a list in UI element 1308. Thus, the advertiser may additionally or alternatively build additional banners using UI element 1304 and/or select third-party tags using UI element 1306.

Figure 14:
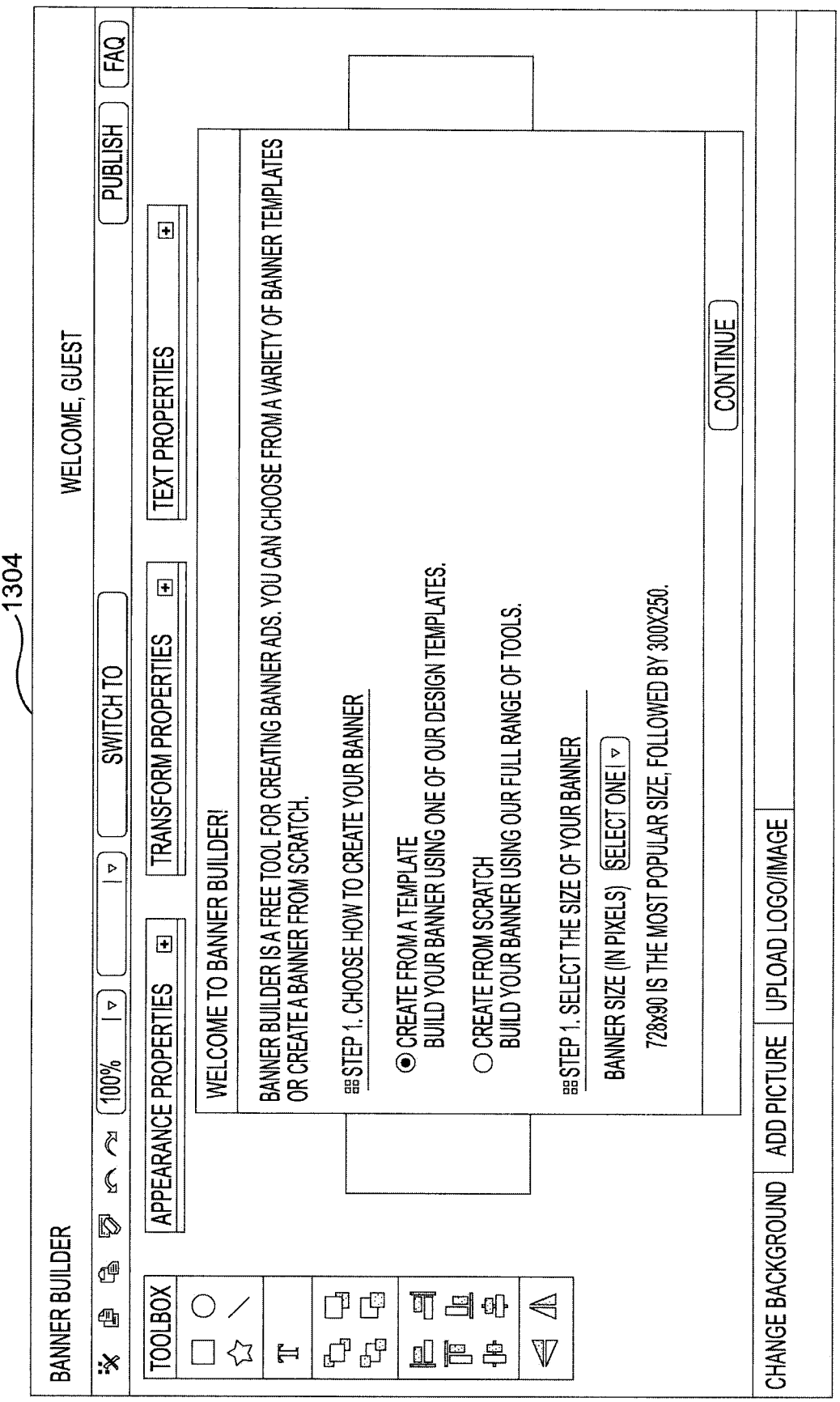
FIG. 14 depicts a screenshot of an exemplary banner building page of a bidding interface consistent with embodiments of the present disclosure.

FIG. 14 depicts a screenshot of an exemplary banner building page of a bidding interface that may be displayed to an advertiser through UI server 110. An advertiser may use the banner building page to either create a banner using a pre-loaded design template or create a banner from scratch. The banner building page may include any number of artwork-type UI elements desired for building a banner, including selecting a banner size, changing a background, adding and modifying graphics, pictures and logos, and adding and modifying text. The advertiser may also define a click-through URL for the banner created using the banner building page.

FIG. 15 depicts a screenshot of an exemplary third-party banner selecting page of a bidding interface that may be displayed to an advertiser through UI server 110. As shown in FIG. 15, an advertiser may name the banner, select a third-party ad server from UI element 1502, select a banner size, and/or enter a third-party code.

FIG. 16 depicts a screenshot of an exemplary account creation page of a bidding interface that may be displayed to an advertiser through UI server 110. As shown in FIG. 16, an advertiser may enter account information, personal information, and/or billing information, as desired. The advertiser may also accept or deny certain terms and conditions, as shown in FIG. 16.

FIG. 17 depicts a screenshot of an exemplary review and launch page of a bidding interface that may be displayed to an advertiser through UI server 110. In particular, the administrator may send and display to the advertiser the selected targeting and bidding details, the budget details, and/or the selected or created banners, which the advertiser may review and either edit, or confirm, to complete the purchase of targeted online advertising.

FIG. 18 depicts a screenshot of an exemplary performance tracking page of a bidding interface that may be displayed to an advertiser through UI server 110. In one embodiment, the administrator may display performance information including, the time period of the campaign, the total impressions, the total clicks, the total conversions, the total spend, the click-through rate (CTR), the conversion rate (CVR), the effective cost per action (eCPA), and/or the effective cost per click (eCPC). The administrator may also display such information graphically, such as the number of clicks, impressions, and/or conversions logged over time, for a given time period.

Accordingly, the present embodiments may advantageously provide scalable and flexible interfaces, systems, and methods for advertisers to selectively target and bid their advertising campaigns. The embodiments may also display segment level information about web populations of interest to advertisers and publishers, as well as provide web populations that may be specially targeted for advertising. Moreover, the presently disclosed systems and methods may be used for segment evaluation prior to an advertiser actually committing to purchasing a targeting product offered in the advertising network.

Specifically, advertisers may be provided with profile information for their customers, knowledge of how advertising affects different user segments, and knowledge of how sales can be improved through more effective advertising via user targeting. Moreover, various reports may be used to identify enterprise clients for custom insights and analytics, leveraging insights obtained from users across the network. Finally, users and/or user segments may be targeted and optimized based on profile information, thereby improving ad serving performance.

Therefore, companies may pay per impression, per click, and/or per conversion, only for those actions that benefit them, because advertisers may control which sites within the network the creatives are displayed upon, and which groups of people are shown their creatives. For example, advertisers may even select the specific demographic or behavioral characteristics of people desired to be shown the advertisers' creatives. As a result, advertisers may pay for ad delivery to desired populations of web users, publishers may maximize the value of their web inventory, and third party networks may fully leverage the relationships between advertiser interests and publisher assets.

The many features and advantages of the disclosure are apparent from the detailed specification, and thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A computer-implemented method for awarding impression requests for online inventory, the method comprising:
   providing, over an Internet, an interactive bidding interface to a first advertiser computer and a second advertiser computer through a web server, the interactive bidding interface including a banner adding page configured to allow the first advertiser computer and the second advertiser computer to upload a banner file, provide a banner click-through URL, or create a banner;
   receiving, by a data server processor, first targeting information from a first advertiser computer via one or more targeting elements of the bidding interface, wherein the data server processor is in communication with the Internet through a firewall;
   receiving, by the data server processor, first online content including a first banner from the first advertiser computer via the banner adding page of the interactive bidding interface;
   receiving, over the Internet, by the data server processor, second targeting information from the second advertiser computer via the one or more targeting elements of the bidding interface;
   receiving, by the data server processor, second online content including a second banner from the second advertiser computer via the banner adding page of the interactive bidding interface;
   providing, over the Internet, to the first advertiser computer and the second advertiser computer, via the bidding interface, minimum bid information and suggested bid information based on the first targeting information and the second targeting information, wherein values displayed for the minimum bid information and the suggested bid information are configured to be updated in real time;
   encoding the targeting information received from the first advertiser computer and the second advertiser computer using at least one of XML or a web API associated with the bidding interface;
   aggregating, by the data server processor, the first targeting information and the second targeting information to generate one or more content bids;
   associating the first online content and the second online content with the one or more generated content bids;
   receiving, over the Internet, by the data server processor, an impression request from a publisher processor, the impression request including one or more constraints; and
   awarding, by the data server processor, the impression request to one of the first advertiser computer and the second advertiser computer based on the one or more generated content bids satisfying the one or more constraints.

2. The computer-implemented method of claim 1, wherein at least one of the first targeting information and the second targeting information includes one or more of geographic constraints, site type constraints, and audience constraints.

3. The computer-implemented method of claim 1, further including:

providing, by the data server processor, one or more of a budget setting page, an account creation page, and a review and launching page to the at least one of the first advertiser computer and the second advertiser computer through the bidding interface; and receiving, by the data server processor, one or more of a daily budget, account information, and a launch confirmation from the at least one of the first advertiser computer and the second advertiser computer through the bidding interface.

4. The computer-implemented method of claim 1, further including:

displaying, by the data server processor, delivery performance information to the at least one of the first advertiser computer and the second advertiser computer through the bidding interface, based on one or more of a click-through rate or conversion rate.

5. A system for awarding impression requests for online inventory, the system configured to:

provide, over an Internet, an interactive bidding interface to a first advertiser computer and a second advertiser computer through a web server, the interactive bidding interface including a banner adding page configured to allow the first advertiser computer and the second advertiser computer to upload a banner file, provide a banner click-through URL, or create a banner;

receive, by a data server processor, first targeting information from the first advertiser computer via one more targeting elements of the bidding interface, wherein the data server processor is in communication with the Internet through a firewall;

receive, by the data server processor, first online content including a first banner from the first advertiser computer via the banner adding page of the interactive bidding interface;

receive, over the Internet, by the data server processor, second targeting information from the second advertiser computer via the one or more targeting elements of the bidding interface;

receiving, by the data server processor, second online content including a second banner from the second advertiser computer via the banner adding page of the interactive bidding interface;

provide to the first advertiser computer and the second advertiser computer, over the Internet, via the bidding interface, minimum bid information and suggested bid information based on the first targeting information and the second targeting information, wherein values displayed for the minimum bid information and the suggested bid information are configured to be updated in real time;

encode the targeting information received from the first advertiser computer and the second advertiser computer using at least one of XML or a web API associated with the bidding interface;

aggregate, by the data server processor, the first targeting information and the second targeting information to generate one or more content bids;

associate the first online content and the second online content with the one or more generated content bids;

receive, over the Internet, by the data server processor, an impression request from a publisher processor, the impression request including one or more constraints; and award, by the data server processor, the impression request to one of the first advertiser computer and the second advertiser computer based on the one or more generated content bids satisfying the one or more constraints.

6. The system of claim 5, wherein at least one of the first targeting information and the second targeting information includes one or more of geographic constraints, site type constraints, and audience constraints.

7. The system of claim 5 further configured to:

provide, by the data server processor, one or more of a budget setting page, an account creation page, and a review and launching page to the at least one of the first advertiser computer and the second advertiser computer through the bidding interface; and receive, by the data server processor, one or more of a daily budget, account information, and a launch confirmation from the at least one of the first advertiser computer and the second advertiser computer through the bidding interface.

8. The system of claim 5 further configured to display, by the data server processor, delivery performance information to the at least one of the first advertiser computer and the second advertiser computer through the bidding interface, based on one or more of a click-through rate or conversion rate.

9. A non-transitory computer-readable storage medium storing a computer program which, when executed by a computer, causes the computer to perform a method of awarding impression requests for online inventory, the method comprising:

providing, over an Internet, an interactive bidding interface to a first advertiser computer and a second advertiser computer through a web server, the interactive bidding interface including a banner adding page configured to allow the first advertiser computer and the second advertiser computer to upload a banner file, provide a banner click-through URL, or create a banner;

receiving, by a data server processor, first targeting information from the first advertiser computer via one more targeting elements of the bidding interface, wherein the data server processor is in communication with the Internet through a firewall;

receiving, by the data server processor, first online content including a first banner from the first advertiser computer via the banner adding page of the interactive bidding interface;

receiving, over the Internet, by the data server processor, second targeting information from the second advertiser computer via the one or more targeting elements of the bidding interface;

receiving, by the data server processor, second online content including a second banner from the second advertiser computer via the banner adding page of the interactive bidding interface;

providing to the first advertiser computer and the second advertiser computer, over the Internet, via the bidding interface, minimum bid information and suggested bid information based on the first targeting information and the second targeting information, wherein values displayed for the minimum bid information and the suggested bid information are configured to be updated in real time;

encoding the targeting information received from the first advertiser computer and the second advertiser computer using at least one of XML or a web API associated with the bidding interface;

aggregating, by the data server processor, the first targeting information and the second targeting information to generate one or more content bids;

associating the first online content and the second online content with the one or more generated content bids;

receiving, over the Internet, by the data server processor, an impression request from a publisher processor, the impression request including one or more constraints; and awarding, by the data server processor, the impression request to one of the first advertiser computer and the second advertiser computer based on the one or more generated content bids satisfying the one or more constraints.

10. The non-transitory computer-readable storage medium of claim 9, wherein the at least one of the first targeting information and the second targeting information includes one or more of geographic constraints, site type constraints, and audience constraints.

* * * * *